(No Model.)

E. M. BENTLEY.
ELECTRIC MOTOR.

No. 377,230. Patented Jan. 31, 1888.

WITNESSES
F. O. Blackwell
G. Renault

INVENTOR
Edward M. Bentley
by Bentley & Knight,
Attys.

UNITED STATES PATENT OFFICE.

EDWARD M. BENTLEY, OF NEW YORK, N. Y.

ELECTRIC MOTOR.

SPECIFICATION forming part of Letters Patent No. 377,230, dated January 31, 1888.

Application filed August 4, 1887. Serial No. 246,160. (No model.)

*To all whom it may concern:*

Be it known that I, EDWARD M. BENTLEY, a citizen of the United States, residing at New York, in the county of New York, State of New York, have invented certain new and useful Improvements in Electric Motors, of which the following is a specification.

My invention relates to the application of electric motors to vehicles for purposes of locomotion; and it consists in gearing the armature-shaft of the motor to the axle through an intermediate counter-shaft, the motor itself being spring-centered about the counter-shaft—that is, the motor is supported on an axial line coinciding with the axis of the counter-shaft—and also on a spring connected to the car-body or a fixed part of the truck, which prevents any rotation of the motor about the axial support.

My invention is illustrated in the accompanying drawings, in which—

Figure 1:
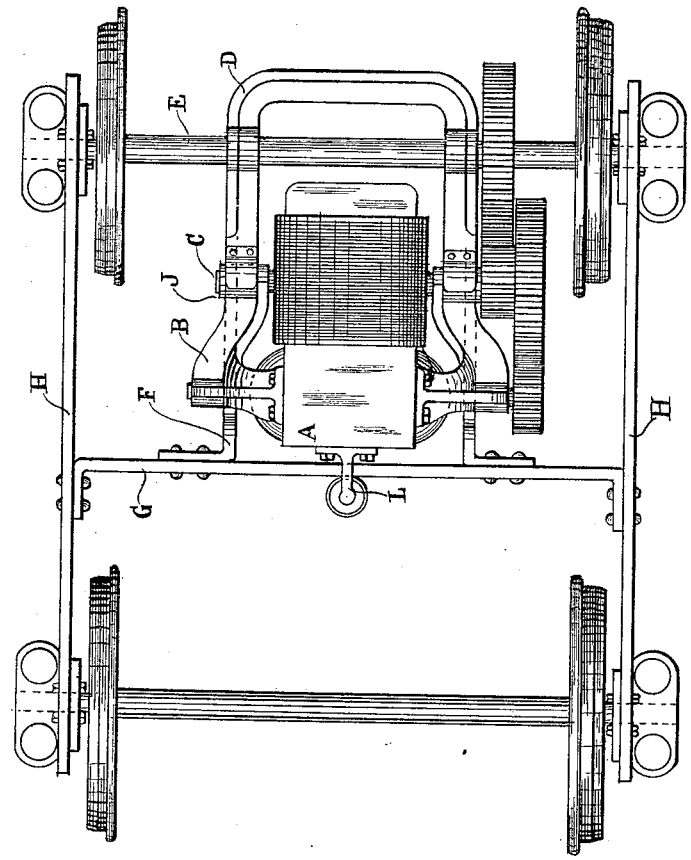
Figure 2:
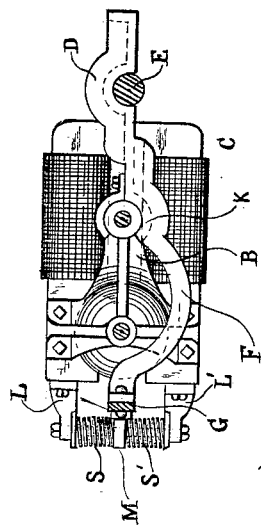

Figure 1 is a plan of a street-car truck embodying my invention; and Fig. 2 is a side elevation of the motor, showing its method of support.

A is the motor, having its armature-shaft journaled in brass castings B, attached to the pole-pieces. Projecting arms on B extend back from the armature and form journals J for the counter-shaft C.

D is a frame journaled directly on axle E and having extensions F, attached to cross-bar G, which in turn is attached to side bars, H, extending between the car-boxes. The journals J form trunnions which rest in sockets K in frame D, and form an axial support for the motor coinciding with the axis of counter-shaft C.

The motor is prevented from rotating to any extent on its trunnions by springs S and S', which are inserted between a flange, M, on bar G and projections L and L', extending from the pole-pieces of the motor. The armature-shaft gears with the counter-shaft, and the latter with the axle by spur-wheels, as is shown in Fig. 1.

It will be evident that my invention may take many forms in practice, its essential feature being the motor spring-centered about the counter-shaft.

I claim—

1. The combination, with an electric motor and mechanism driven thereby, of an intermediate counter-shaft about which the motor is spring-centered, substantially as described.

2. The combination, in an electric locomotive, of the counter-shaft connected to the axle and itself driven by gearing from the motor-shaft, the motor, an axial support therefor coincident with the axis of the counter-shaft, and a spring in the line of rotation of the motor about said support.

3. The combination, in an electric locomotive, of a frame journaled on the axle and a motor and counter-shaft supported thereby, the motor gearing with the counter-shaft and being spring-centered thereon.

EDWARD M. BENTLEY.

Witnesses:
 ROBT. W. BLACKWELL,
 JAS. L. BLACKWELL.